United States Patent

[11] 3,588,046

[72] Inventors Rufus J. Weaver
 13 East St.;
 Anthony J. Gaetano, New London, Conn. 06320 (98 Park Ave., Uncasville, Conn. 06382)
[21] Appl. No. 769,184
[22] Filed Oct. 21, 1968
[45] Patented June 28, 1971

[54] VEHICLE JACK AND ASSEMBLY THEREFOR
 7 Claims, 7 Drawing Figs.
[52] U.S. Cl. .................................................. 254/85, 254/110
[51] Int. Cl. .................................................. B66f 3/08, B66f 1/04
[50] Field of Search ........................................ 254/84, 85, 108—111

[56] References Cited
UNITED STATES PATENTS

| | | | |
|---|---|---|---|
| 730,329 | 6/1903 | Wright | 254/85 |
| 1,337,065 | 4/1920 | Garcia | 254/85 |
| 1,478,307 | 12/1923 | Sykes | 254/85 |
| 1,635,617 | 7/1927 | Hall | 254/85 |
| 1,908,793 | 5/1933 | Saeder | 254/84 |

Primary Examiner—Othell M. Simpson
Assistant Examiner—David R. Melton
Attorney—Sol B. Wiczer ABSTRACT: The disclosed invention is a lifting jack for attachment to a bumper of a vehicle for safely lifting, for example, a wheel of the vehicle off the ground. The lifting jack includes a vertically and horizontally adjustable assembly for safely positioning the jack relative to the vehicle bumper during lifting. In an embodiment, the present invention includes a horizontally adjustable assembly for use in combination with an automobile bumper jack.

INVENTORS
RUFUS J. WEAVER
ANTHONY J. GAETANO
BY

Sol B. Wiczer
ATTORNEY

INVENTORS
RUFUS J. WEAVER
ANTHONY J. GAETANO

INVENTORS
RUFUS J. WEAVER
ANTHONY J. GAETANO
BY
Sol B. Wier
ATTORNEY

VEHICLE JACK AND ASSEMBLY THEREFOR

The present invention relates to a lifting jack and, more particularly, to a bumper jack including means for safely lifting, for example, a wheel of a vehicle off the ground. In an embodiment, the present invention provides a horizontally adjustable assembly for use in combination with an automobile bumper jack.

Because automobiles have relatively long overhang from the axle, it has become common to use a bumper jack for replacing a flat tire. This use is not wholly satisfactory because as jacking takes place the axle springs relax and allow the wheel to remain on the ground until the bumper jack has been actuated to a very high jacking position. Under these conditions there is considerable instability during the jacking-up operation with a tendency for the jack to tip relative to its ground fixed base. It has now been found that by the practice of the present invention, a horizontally adjustable assembly is provided which overcomes the problem of jack tipping; provides a lifting jack for attachment to the bumper of a vehicle which includes means for vertically and horizontally adjusting the jack during the vehicle jacking-up operation; and to a method of using such a device.

Generally stated, the present invention provides a horizontally adjustable assembly for use in combination with a lifting jack. The assembly includes a base platform having an upper support positioned thereon for horizontal movement relative to the base platform. Means are included for horizontally moving the upper support relative to the base platform. The support desirably includes a lifting jack-receiving means for receiving either a base platform of a bumper jack or, a ratchet bar or jack strut of such a jack.

In an embodiment, the present invention provides a relatively simple and inexpensive assembly for use in combination with a bumper jack which prevents tipping or pivotal movement with the ratchet bar of the jack relative to its ground fixed base during the jacking-up operation. By providing a horizontally moveable support, the apparatus of the present invention retains the ratchet bar of a bumper jack in substantially vertical position at all times during the jacking-up operation.

The present invention will become more apparent from the following detailed description taken in conjunction with the drawings wherein like reference numerals refer to similar elements.

IN THE DRAWINGS

Figure 1:
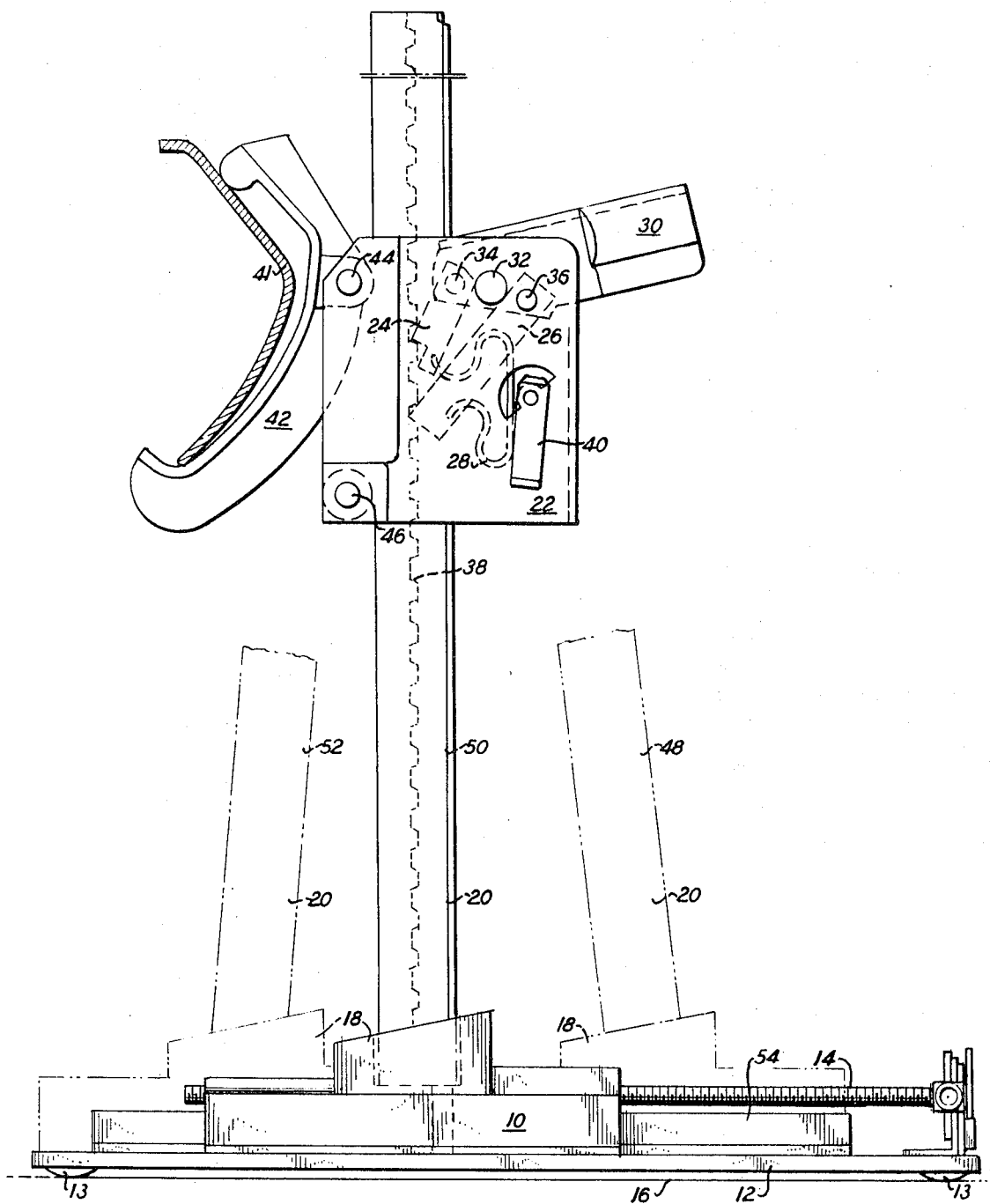
FIG. 1 is a side elevational view illustrating a sequence of operations for the assembly of the present invention for moving a ratchet bar of a bumper jack from tilted to vertical position.

Referring to the drawings, FIG. 1 illustrates horizontally adjustable assembly 10 having base platform 12, ground contacts 13, and drive shaft 14 associated therewith. Drive shaft 14 positions horizontally adjustable assembly 10 relative to base platform 12. The base platform is thus ground stationary relative to foundation 16. Horizontally adjustable assembly 10 may include means 18 for receiving a lifting jack assembly, which means may be designed either to receive a foundation base of a bumper jack, or, alternatively, may be designed to receive a ratchet bar or jack strut of the jack, as desired. The horizontally adjustable assembly may include ratchet bar 20 firmly secured in position; although it is recognized for versatility that the ratchet bar may be readily disengaged from lifting jack-receiving means 18.

Disposed on ratchet bar 20 is housing 22 preferably formed from a pair of sheet metal plates. Mounted within housing 22 is a suitable load-lifting mechanism such as one including a pair of pawls 24 and 26 which are interconnected by springs 28. Also mounted on housing 22 is actuating arm 30 which is pivoted on housing 22 about the axis of pin 32. One end of each pawl 24 and 26 is pivotally connected to arm 30 such as at pivotal points 34 and 36 respectively, while the other end of each pawl contacts teeth 38 of ratchet bar 20.

When the load-lifting mechanism is in the position shown in FIG. 1, housing 22 is moved downwardly along ratchet bar 20 by a lever arm, not shown, positioned to upwardly and downwardly pivot actuating arm 30. When it is desired to raise housing 22 on ratchet bar 20, spring 28 is urged to the left, as viewed in FIG. 1, by means of arm 40 which reverses the sequence of operation of pawls 24 and 26.

Further illustrated in FIG. 1 is bumper 41 positioned in load support 42 pivotally mounted to housing 22 by pivot pin 44. Desirably, roller 46 which contacts one side of ratchet bar 20 is included to facilitate easy movement of housing 22 along ratchet bar 20 when a load is positioned on load support 42. Roller 46 is disposed on the same side of the ratchet bar as is pivot pin 44, and preferably is located substantially vertically beneath the pivot pin. Thus, when a load is positioned on load support 42, a weight force is transmitted to housing 22 in a manner which tends to rotate the housing about the pawls in a counterclockwise direction, as viewed in FIG. 1, so that a substantial portion of the load is applied directly to ratchet bar 20 by roller 46.

During the jacking-up operation, load support 42 may receive the bumper of a vehicle with the ratchet bar 20 being positioned such as illustrated by position 48. By rotating assembly drive shaft 14, as described hereinafter, horizontally adjustable assembly 18 may be advanced to the position 50 for ratchet bar 20. If, for any reason, ratchet bar 20 occupies position 52, drive shaft 14 may be counterrotated to return the ratchet bar to position 50 for normal substantially vertical lifting of a load. It may be thus recognized that operation of the unit illustrated in FIG. 1 effectively corrects tilting of a lifting jack during the lifting operation by means of a horizontally adjustable assembly.

Figure 2:
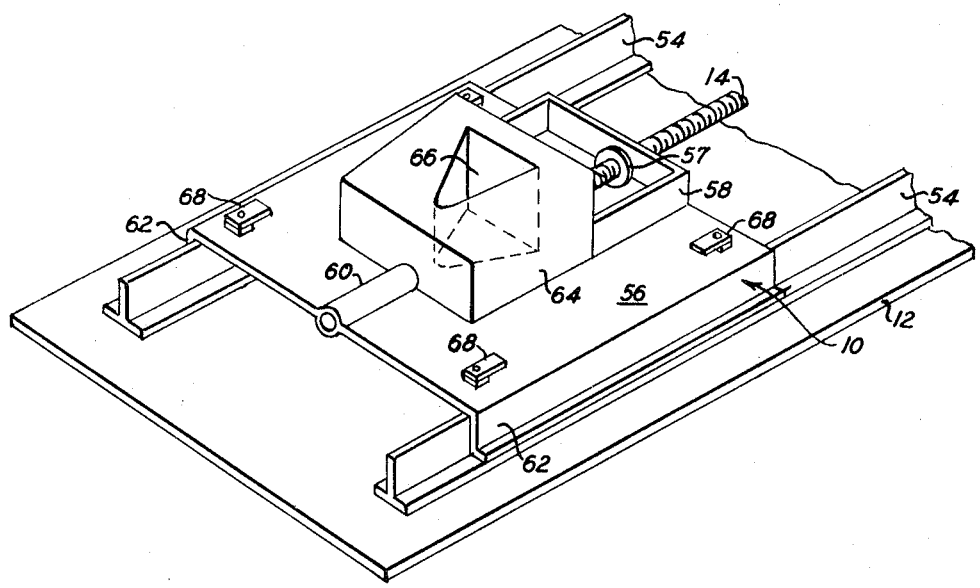
FIG. 2 is a perspective view illustrating the forward section of a horizontally adjustable assembly for use in combination with a lifting jack.

FIG. 2 illustrates horizontally adjustable assembly 10 in greater detail. Disposed on base platform 12 is a series of vertically positioned rails 54 which serve as runners for upper support 56 of the horizontally adjustable assembly 10. Drive shaft 14 appearing as a screw which rotates in bolt 57 fixed as part of the upper support positions the upper support horizontally, as desired. Bolt 57 is secured to frame 58 which is suitably attached to upper support 56. If desired a drive shaft receiving tube 60 may be included to receive the drive shaft when the upper support is positioned to the right of that illustrated in FIG. 2.

Rails 54 appear as inverted T-members having a bearing surface to receive a substantially L-shaped side 62 of upper support 56. Conveniently disposed on upper support 56 is ratchet bar receiving block 64 for receiving the ratchet bar of a bumper jack. The ratchet bar of a bumper jack may be received within a conveniently provided slot 66. Alternatively, suitable clamping means 68 may be included on upper support 56 for clamping the base which supports a ratchet bar of a bumper jack assembly, in which case block 64 may be removed or positioned such to provide for receipt of the ratchet bar. It is apparent from FIG. 2 that as shaft 14 rotates, linear forces on bolt 57 horizontally adjust assembly 56 in any relative position to fixed base 12, as desired. Although it is preferred that rotatable drive assembly 14 be used for horizontally positioning upper support 56 relative to base 12, it is recognized that other means may be employed for horizontally adjusting the upper support as desired. One useful means which may be employed as a horizontal drive is that disclosed by Hunz in U.S. Pat. No. 2,463,772, wherein a ratchet bar which supports a carriage or pawl mechanism is disclosed positionable longitudinally along the bar by pawls contained within a housing and actuated by a lever. Various other means, mechanical, hydraulic, or the like, may be employed to horizontally position support 56 relative to base 12 of the apparatus of the present invention.

Figure 3:
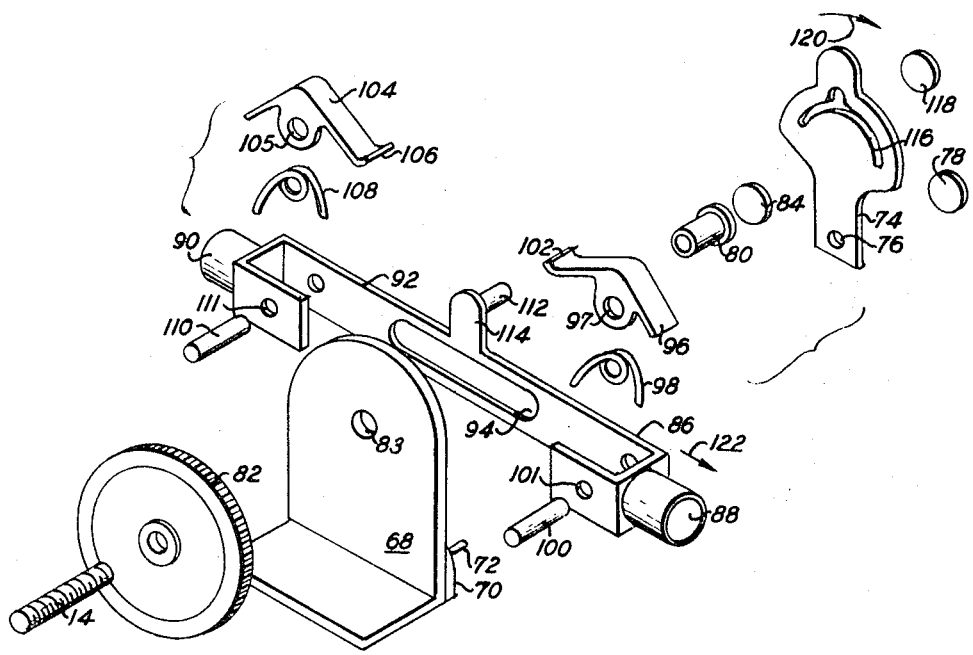
FIG. 3 is an exploded view taken in perspective of the ratchet assembly for positioning the horizontally adjustable assembly.
Figure 4:
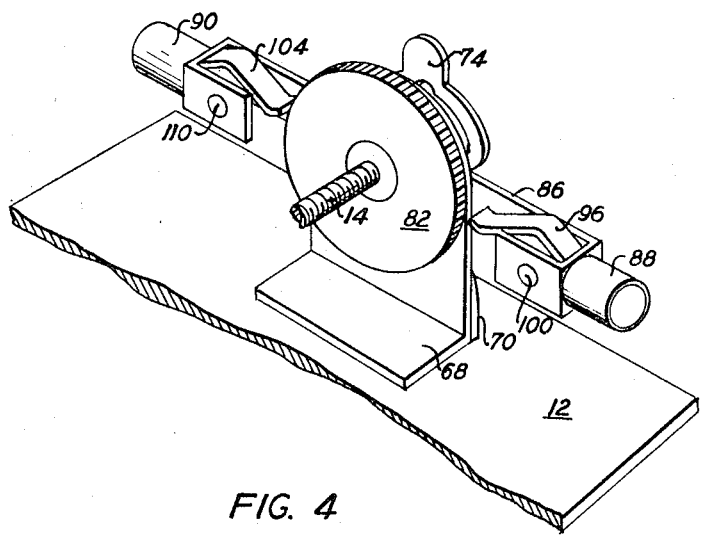
FIG. 4 illustrates the ratchet assembly of FIG. 3 taken as a perspective view.

FIG. 3 is an exploded view of the several element forming the ratchet assembly illustrated further in FIG. 4. The ratchet assembly includes support member 68 having rocker support 70 and pin 72 for holding positioning lever 74 by means of hole 76. Screwcap 78 may be secured to pin 72 conveniently as desired. Bushing 80 is received within slot 83 of support 68 and may receive drive shaft 14 fixed to drive wheel 82. Cap 84 may be secured to bushing 80 if desired.

Rotation of wheel 82 rotates drive shaft 14 in either a clockwise or counterclockwise direction for positioning horizontally adjustable assembly 10. Wheel 82 fixed to drive shaft 14 may be driven by ratchet assembly 86 having lever receiving tube 88 disposed at one end thereof for movement in one direction; and by lever-removing tube 90 oppositely disposed relative to drive wheel 82 for movement in an opposite direction. Lever-receiving tubes 88 and 90 are secured to frame 92 having conveniently removed from a portion thereof, central slot 94, such that movement of positioning lever 74 permits the ratchet assembly to move into engaging and disengaging position for drive wheel 82, for either clockwise or counterclockwise rotation thereof by movement of levers introduced within tubes 88 and 90, respectively. Near one end of ratchet assembly 86 is desirably included pawl 96 engaged by spring 98 and supported positioned by pin 100 through hole 101 within the assembly. Pawl 96 is spring biased to permit return without causing wheel 82 to move, whereas in positive gripping position wheel-gripping surface 102 positively turns wheel 82 in a counterclockwise direction. Oppositely disposed to pawl 96 is pawl 104 also including wheel drive surface 106, and having spring 108 for biasing the same in similar fashion to pawl 96. Pin 110 supports pawl 104 within provided hole 111 of the ratchet assembly.

Ratchet assembly 86 may be moved into wheel-engaging position for clockwise or counterclockwise rotation by positioning lever selector pin 112, secured to plate 114 integral with element 92 of ratchet bar 86. Positioning lever selector pin 112 is moved into position by provided arcuate slot 116 at lever 74. Pin 112 may be secured, if desired, in position in the arcuate slot by screwcap 118. Other means may be included for positioning pin 112 within provided arcuate slot 116, if desired.

Movement of selector lever 74 in the direction of arrow 120 causes a resultant movement of ratchet 86 in the direction of arrow 122. Counter movement of selector 74 to that of arrow 120 causes a counter movement of ratchet bar 86 to that of arrow 122. Thus, wheel drive surface 106 of pawl 104 may engage wheel 82 upon movement in the direction of arrow 122 when selector 74 is moved in the direction of arrow 120. Movement contrary to arrow 122 permits wheel drive surface 102 of pawl 96 to engage wheel 82.

FIG. 4 illustrates the position occupied by the elements of FIG. 3 when selector 74 is moved in the direction indicated by arrow 120, such that pawl 104 engages drive wheel 82 by wheel drive surface 106. It is thus apparent that upon engagement of wheel 82 by pawl 104, pawl 96 is removed from engagement position of wheel 82 and vice versa.

Figure 5:
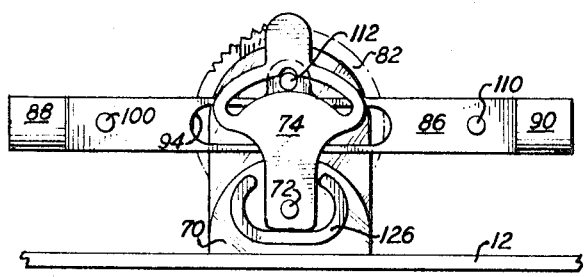
FIG. 5 is a rear elevational view taken of the ratchet assembly of FIG. 4.
Figure 6:
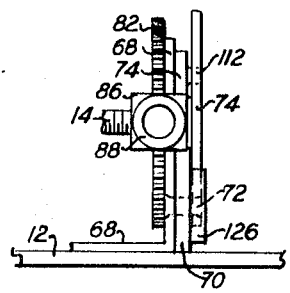
FIG. 6 is a left side elevational view taken of the ratchet assembly of FIG. 5.

FIGS. 5 and 6 further illustrate the combination of elements of FIG. 4 with FIG. 5 being taken as a rear elevational view of the ratchet assembly of FIG. 4 and FIG. 6 taken as a left side elevational view of the assembly of FIG. 5. The assembly illustrated in FIGS. 5 and 6 is that of normal, locked, nonoperating position wherein pin 112 is locked intermediate the arcuate slot of selector 74.

Figure 7:
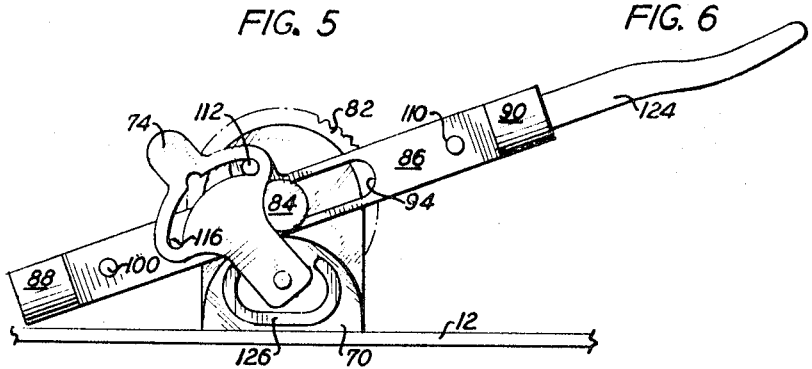
FIG. 7 illustrates the ratchet assembly with lever attachment during positioning of the horizontally adjustable assembly of FIG. 2.

FIG. 7 further illustrates the ratchet assembly taken as an elevational view with positioning lever 74 positioned such that pawl 104 is in positive, engaging position with drive wheel 82 for rotation about the axis of bushing 84 in a counterclockwise fashion when lever 124 is pumped upwardly and downwardly. Lever 124 may be removed for positioning in lever-receiving tube 88 for opposite rotation when position lever 74 is moved from the position illustrated in FIG. 7 to the converse position in arcuate slot 116. If desired, modified U-shaped bracket 126 may be included to provide a housing for receiving positioning lever 74.

It will be apparent from the foregoing that when a horizontally adjustable assembly is actuated, the operator is positioned away from the jack to prevent danger in the event of slippage or tilting of the vehicle during jacking. The present horizontally adjustable assembly requires that the operator be positioned to the side of the bumper jack, thus putting him outside of danger in the event of slippage. Thus, not only does the present invention provide a safety factor in correcting any tilting of the ratchet bar which may result during the jacking-up operation, but it also provides an added safety factor by removing the operator from the area of the bumper jack during the ratchet bar tilting correction operation.

The various elements of the present apparatus, unless otherwise indicated, may be secured to adjoining elements by any suitable means such as bolts, welding, rivets or the like. In addition, auxiliary support or reinforcement members may be also included as part of the apparatus where required.

Although a preferred embodiment of the invention has been illustrated herein, it is to be understood that various changes and modifications may be made in the construction and arrangement of elements without departing from the spirit and scope of this invention.

We claim:

1. A jack assembly for attachment to a bumper of a vehicle for safely lifting the vehicle off the ground, said jack assembly comprising in combination:
   a. a base platform;
   b. an upper support positioned for horizontal movement relative to said base platform;
   c. means for horizontally moving said upper support;
   d. a lifting jack receiving means disposed on said upper support for pivotally and removably receiving a ratchet bar of a bumper jack;
   e. a vertically adjustable housing disposed on said ratchet bar;
   f. a pivotal bumper-engaging member attached to said vertically adjustable housing;
   g. said lifting jack receiving means and said pivotal bumper-engaging member permitting vertical and horizontal adjustments for safely positioning the jack relative to the bumper during lifting.

2. The jack assembly as defined in claim 1 wherein the upper support is positioned for horizontal movement on vertically disposed rails positioned on said base platform.

3. The jack assembly as defined in claim 1 wherein said lifting jack receiving means receives a base platform of a bumper jack.

4. The jack assembly as defined in claim 1 wherein said lifting jack receiving means receives a ratchet bar of a bumper jack.

5. The jack assembly as defined in claim 1 wherein said means for horizontally moving said upper support is by a ratchet-operated wheel, said wheel driving a threaded shaft for moving said adjustable assembly.

6. The jack assembly as defined in claim 5 wherein said threaded shaft is fixed to and projects from near the center of rotation of said ratchet-operated wheel.

7. The jack assembly as defined in claim 5 wherein a selector is included for locked, clockwise and counterclockwise rotation of said ratchet-operated wheel.